US010105721B2

(12) United States Patent
Carta

(10) Patent No.: US 10,105,721 B2
(45) Date of Patent: Oct. 23, 2018

(54) DISPENSER WITH A HERMETIC SEAL

(71) Applicant: APTAR ITALIA S.P.A., San Giovanni Teatino (CH) (IT)

(72) Inventor: Lamberto Carta, Pescara (IT)

(73) Assignee: APTAR ITALIA S.P.A., San Giovanni Teatino (CH) (IT)

( * ) Notice: Subject to any disclaimer, the term of this patent is extended or adjusted under 35 U.S.C. 154(b) by 0 days.

(21) Appl. No.: 15/030,633

(22) PCT Filed: Sep. 19, 2014

(86) PCT No.: PCT/IT2014/000254

§ 371 (c)(1),
(2) Date: Apr. 20, 2016

(87) PCT Pub. No.: WO2015/059727

PCT Pub. Date: Apr. 30, 2015

(65) Prior Publication Data

US 2016/0263603 A1 Sep. 15, 2016

(30) Foreign Application Priority Data

Oct. 25, 2013 (IT) ............................ RM2013A0591

(51) Int. Cl.
*B67D 7/60* (2010.01)
*G01F 11/00* (2006.01)
*B05B 11/00* (2006.01)

(52) U.S. Cl.
CPC ...... *B05B 11/3069* (2013.01); *B05B 11/0089* (2013.01); *B05B 11/3001* (2013.01);
(Continued)

(58) Field of Classification Search
CPC ............ B05B 11/3069; B05B 11/0089; B05B 11/3001
(Continued)

(56) References Cited

U.S. PATENT DOCUMENTS 3,187,960 A * 6/1965 Gorman ............. B05B 11/3023
222/321.9
6,230,942 B1 5/2001 Kuo
(Continued)

FOREIGN PATENT DOCUMENTS

| | | |
|---|---|---|
| EP | 1388500 | 2/2004 |
| FR | 2894633 | 6/2007 |
| GB | 2119868 | 11/1983 |

OTHER PUBLICATIONS

International Search Report PCT/IT2014/000254 dated Mar. 3, 2015.

*Primary Examiner* — Jeremy W Carroll
(74) *Attorney, Agent, or Firm* — Young & Thompson

(57) ABSTRACT

A dispenser (1) with a hermetic seal includes a hollow containment body (2) which can be inserted in a bottle, a lower suction tube (5), a piston (7) slidable inside the containment body (2), a hollow stem (6) axially slidable inside the containment body (2), a sealing valve (8) inserted in a bottom portion (4) of the containment body (2) and interposed between the suction tube (5) and the dosing chamber (11). The sealing valve (8) is cup-shaped and the piston (7) has a lower sealing portion (**7*b*) configured in such a way as to interact in compression with an upper edge (8*a*) of the sealing valve (8) making a hermetic seal between the sealing valve (8) and the piston (7**).

12 Claims, 4 Drawing Sheets

(52) U.S. Cl.
CPC ........ *B05B 11/306* (2013.01); *B05B 11/3047* (2013.01); *B05B 11/3094* (2013.01)

(58) Field of Classification Search
USPC .......................................................... 222/386
See application file for complete search history.

(56) References Cited

U.S. PATENT DOCUMENTS

| | | | | |
|---|---|---|---|---|
| 6,962,273 | B2 * | 11/2005 | Masuda | B05B 11/0048 222/256 |
| 2002/0166876 | A1 * | 11/2002 | Masuda | B05B 11/3074 222/309 |
| 2005/0167451 | A1 | 8/2005 | Shimada et al. | |
| 2010/0176158 | A1 * | 7/2010 | Carta | B05B 11/3023 222/321.9 |
| 2010/0206910 | A1 * | 8/2010 | Carta | B05B 11/0016 222/207 |
| 2010/0230443 | A1 | 9/2010 | Ding | |
| 2010/0264172 | A1 * | 10/2010 | Nossbaum | B65D 83/0011 222/390 |
| 2011/0303702 | A1 * | 12/2011 | Wang | B05B 11/3023 222/336 |
| 2012/0024909 | A1 * | 2/2012 | Carta | B05B 11/0016 222/321.9 |
| 2014/0084027 | A1 * | 3/2014 | Wang | B05B 11/0008 222/153.13 |

* cited by examiner

Fig.1
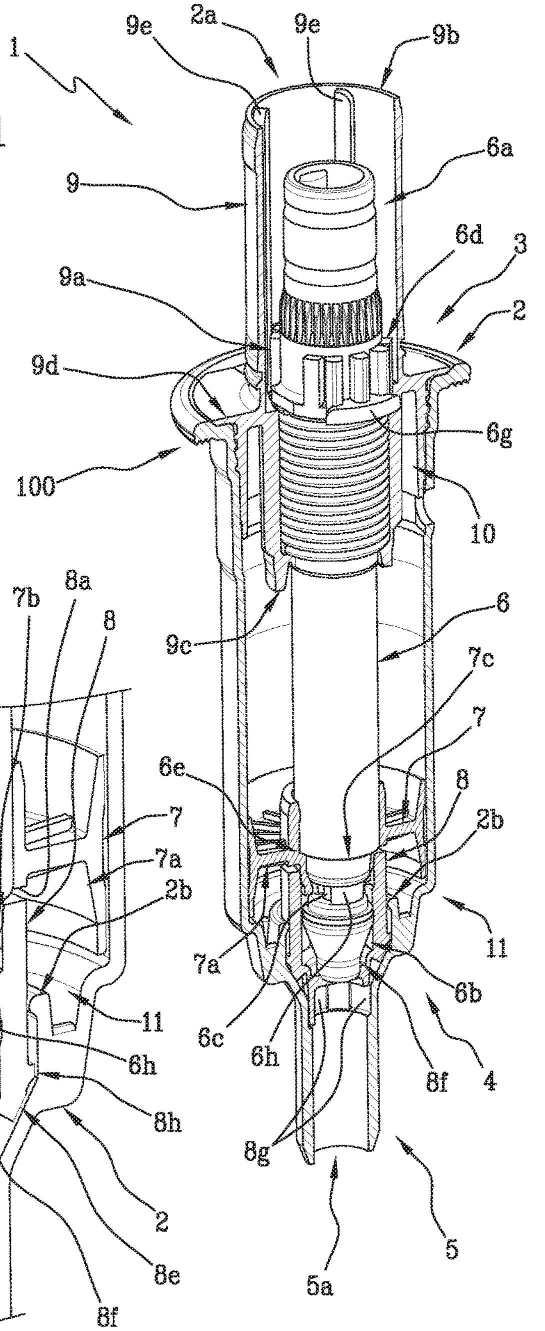
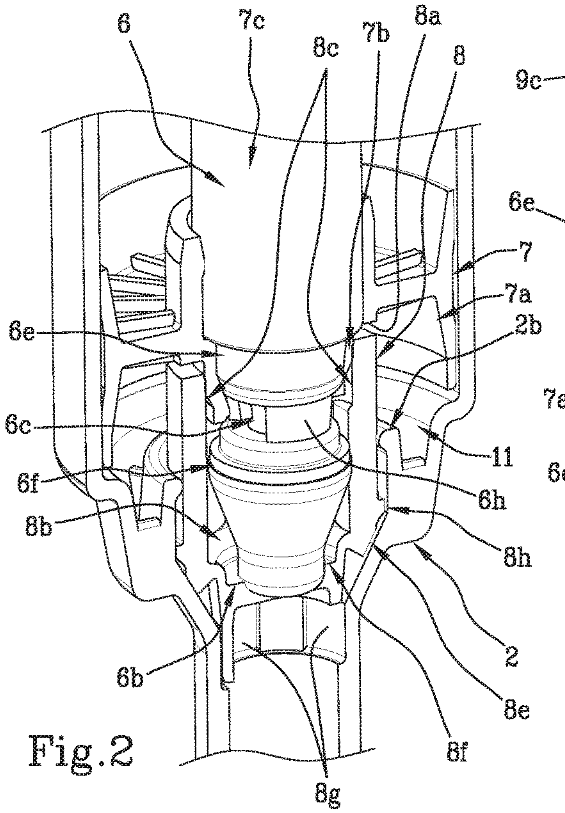
Fig.2

DISPENSER WITH A HERMETIC SEAL

BACKGROUND OF THE INVENTION

Field of the Invention

This invention relates to a dispenser with a hermetic seal, that is to say, a dispensing device applicable to the neck of a bottle in order to deliver the fluid contained in the bottle.

More specifically, this invention relates to a dispenser with a hermetic seal of the type comprising a containment body which is substantially axisymmetric in shape, internally hollow and insertable in the neck of a bottle for fluids such as fluid detergent substances in general or liquid soap. The dispenser according to this invention makes it possible to create a hermetic seal of the fluid dispensed in a closed operating configuration of the dispenser.

Description of the Related Art

In prior art solutions, the containment body of the dispenser is equipped at the bottom end with an orifice for the infeed of the liquid product present in the bottle. The orifice is alternately opened or closed by a valve, which is movable inside the containment body, in particular inside a dosing chamber included therein. Generally, the valve may have different shapes, by way of an example it may have a plain shutter having a frustoconical shape or it may be a body with a spheroidal type.

The containment body is usually connected to the neck of a bottle, without the possibility of movements relative to it, for example, by means of a threaded ring nut connected to it.

Housed in the containment body, in addition to the above-mentioned valve, there is an internally hollow stem and a piston, associated with the stem.

The stem generally has in the upper part a duct which can be connected to the above-mentioned spout for dispensing the fluid and below there is a portion with a shaped head.

The shaped head of the stem comprises at least one lateral opening for passage of the fluid during use of the dispenser.

The piston connected to the stem is such that it interacts with the above-mentioned lateral opening during operation of the dispenser.

The piston also acts on the inner walls of the containment body sliding along them and creating a variable volume for accumulation and/or transit of the fluid, in jargon also known as the dosing chamber.

The dosing chamber is formed by the space between the piston guided by the stem and the bottom portion (where there is the orifice) of the containment body.

Between the piston and the stem there are means for opening and closing the hollow in the stem in such a way as to selectively place the inside of the stem in fluid communication with the dosing chamber.

The stem, at the upper end, generally comprises a spout for dispensing the fluid.

In the prior art, the operation of the dispenser for dispensing the fluid occurs by pressing on the dispensing spout to impart a vertical downwards movement of the stem inside the containment body and a subsequent upwards movement of the spout is facilitated by the action of a spring.

More specifically, during the downwards movement, the piston creates an overpressure inside the dosing chamber, the hollow in the stem is in fluid communication with the dosing chamber and the fluid in the dosing chamber rises along the stem and is dispensed through a dispensing spout.

In this configuration, the valve is lowered and occludes the above-mentioned orifice due to the overpressure in the dosing chamber. In this way, the passage of the fluid from the tank through the orifice is obstructed by the valve.

During the raising, the fluid communication between the cavity of the stem and the dosing chamber is interrupted, and the piston creates a negative pressure inside the dosing chamber; in these conditions, the valve is raised and leaves open the orifice allowing the fluid to be drawn from the bottle inside the dosing chamber.

It is known that in a configuration of the dispenser, or rather of the entire product for dispensing the fluid, which is also called in jargon the “shelf condition”, which is useful for its storing and/or positioning on sales shelves, the spout and the inside stem are in the lowered position in a reversibly permanent manner.

The temporary locking of the stem and the spout in the lowered position is possible by using suitable locking systems. In the prior art this configuration is achieved, for example, by completely lowering the spout and rotating it along the vertical axis according to a predetermined angle.

In this lowered position, which allows the space indicated for storage of the dispenser to be reduced (at least vertically), the complete sealing of the package, and the hermetic seal of the dispenser, must be guaranteed.

More specifically, the escape of liquid through the normal dispensing path must be prevented which, in the closed dispenser condition, must therefore be interrupted. In effect, if this were not the case, an overpressure generated inside the bottle, for example due to the squeezing of the bottle or due to a reduced ambient pressure, might favour the flow of liquid through the dispenser such as to make it spurt out through the dispensing spout.

Generally, the escape of the liquid is prevented by forcing the valve which occludes the inlet orifice into its closed position.

More specifically, the valve is pushed downwards by the action of the stem when this is locked in its lowered position. The tapered contact between the valve and the containment body provides a coupling with a hermetic seal which prevents the passage of liquid.

However, such a system has limitations and drawbacks.

Sometimes, the effect of compression of the stem on the valve is insufficient due to construction reasons and/or due to the materials selected; in effect the stem and/or the valve when subjected to particular thermal and/or mechanical stresses lose certain physical and mechanical properties present originally.

In other situations, a mechanical stress caused by pressing on the spout and on the stem, and therefore also on the closing valve, due for example to continuous and excessive stacking of packages, is sufficient to adversely affect the seal of the conical coupling between valve and containment body, and cause an escape of fluid from the bottle.

A situation in which the above-mentioned packages are also subject to rough transport conditions results in a worsening of the above-mentioned problem of escape of the fluid.

BRIEF SUMMARY OF THE INVENTION

In this context, the technical purpose which forms the basis of this invention is to propose a dispenser which overcomes the above mentioned drawbacks of the prior art.

More specifically, the aim of this invention is to provide a dispenser with a hermetic seal which offers a high quality of the hermetic seal, in particular which allows a hermetic seal of the fluid to be obtained under particular and difficult conditions of transport or storage.

The technical purpose indicated and the aim specified are substantially achieved by a dispenser with a hermetic seal with the technical features set out in one or more of the appended claims.

BRIEF DESCRIPTION OF THE DRAWINGS

Further features and advantages of the invention are more apparent in the detailed description below, with reference to a preferred, non-limiting, embodiment of a dispenser with a hermetic seal as illustrated in the accompanying drawings, in which:

FIG. 1 is a perspective view, in cross section, of a dispenser according to this invention in an operating configuration;

FIG. 2 is an enlarged view of a detail of the dispenser of FIG. 1;

DETAILED DESCRIPTION OF THE PREFERRED EMBODIMENTS

Figure 3:
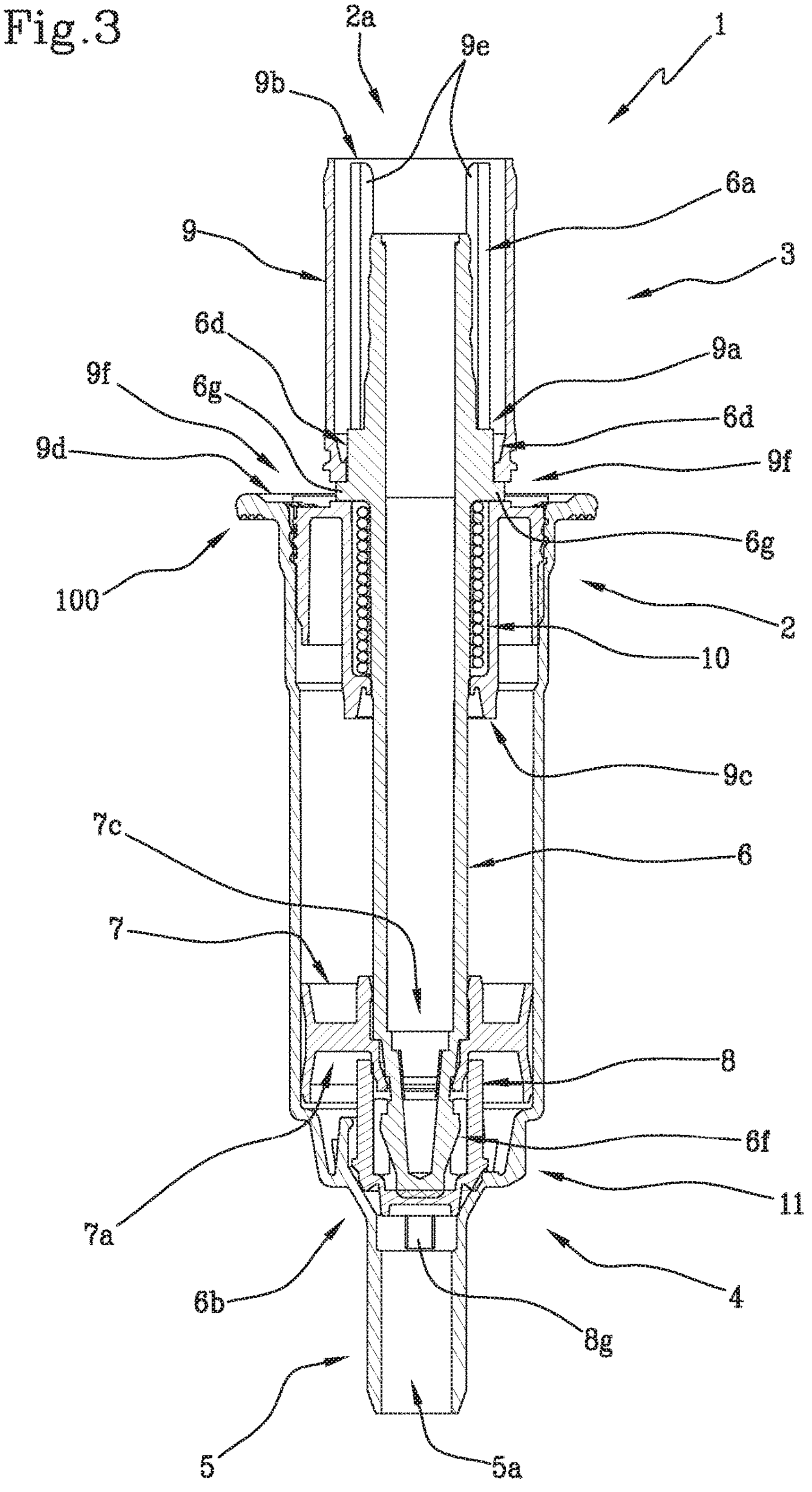
FIG. 3 is a cross section view of the dispenser shown in FIG. 1.

With reference to the annexed FIG. 1, the numeral 1 denotes a dispenser with a hermetic seal according to this invention.

The dispenser 1 comprises a hollow containment body 2 which can be inserted in a bottle for fluids (in the accompanying drawings, the bottle for fluids is not illustrated) and preferably having a geometry which is axisymmetrical and substantially funnel-shaped at least in its lower part.

The containment body 2 has a top portion 3 and a bottom portion 4, between which a cylindrical portion extends. Preferably, the top portion 3 has a diameter greater than that of the bottom portion 4.

At the top portion 3 the containment body 2 has anchoring means 100 for the secure connection with systems for fixing to the bottle. The fixing systems may be of known type, such as, for example, a threaded ring nut.

The top portion 3 of the containment body 2 is open and is designed to allow the insertion into the containment body 2 of the elements described in detail below and included in the containment body 2.

Moreover, at the top portion 3, the containment body 2 comprises a covering sleeve 2*a*.

At the base end of the bottom portion 4 of the containment body 2 there is a lower suction tube 5 equipped with an orifice 5*a* for sucking a fluid from the bottle.

Preferably, the lower suction tube 5 can be lengthened by using a flexible tube designed to reach the bottom of the bottle for a complete emptying of the bottle.

The above-mentioned flexible suction tube to be is not illustrated in the accompanying drawings.

The dispenser 1 also comprises a stem 6 inserted inside the containment body 2 and in particular extending between the above-mentioned top 3 and bottom 4 portions.

The stem 6 is axially slidable inside the containment body 2 in ways which are described below.

The stem 6 is preferably cylindrical in shape and internally hollow so as to allow the passage of fluid.

Preferably, the stem 6 has an upper portion 6*a* adjacent to the top portion 3 of the containment body 2, and a lower portion 6*b*, opposite to the upper portion 6*a*, adjacent to the bottom portion 4 of the containment body 2.

The upper portion 6*a* may be preferably designed for fitting a dispensing spout (not illustrated in the accompanying drawings).

Preferably, the lower portion 6*b* of the stem 6 has a portion with a shaped head, by way of example with a frustoconical shape, as illustrated in the accompanying drawings, which is separated from the remaining part of the stem 6 (having a cylindrical shape) by a portion having a reduced cross-section 6*h*.

At the above-mentioned shaped portion of the stem 6 with a reduced cross-section 6*h*, there is at least one through lateral opening 6*c* for the passage of the fluid from the outside of the stem 6 towards the duct defined internally by the stem 6, during the use of the dispenser 1.

The stem 6 at the upper portion 6*a* has sliding tabs 6*d*. The sliding tabs 6*d* project radially along an annular portion of the stem 6 and extend for a portion along the direction of extension of the stem 6.

The sliding tabs 6*d* are preferably equidistant and symmetrical relative to the direction of extension of the stem 6.

Preferably, in a position below the above-mentioned sliding tabs 6*d*, the stem 6 comprises at least two locking tabs 6*g*.

Preferably, the locking tabs 6*g* extend in a radial direction for an annular portion of the stem 6 and are diametrically opposite each other.

A piston 7 is mounted on the stem 6, located at the bottom end 6*b* of the stem 6. The piston 7 is inserted in the inner cavity formed by the containment body 2 and is axially slidable along the containment body 2 with the purpose of forming a hermetic seal on the inner wall of the cylindrical portion of the containment body 2. Preferably, the piston 7 is mounted on the stem 6 in such a way as to have a possibility of a relative sliding axially along the stem, whilst maintaining a stem-piston coupling with a hermetic seal.

The stem 6 and the piston 7 form, in conjunction with a bottom portion 4 of the containment body 2, a dosing chamber 11 with a variable volume, which is described in more detail below.

A dispensing spout associated with the upper portion 6*a* of the stem 6, as described above, is the predetermined element for driving the actuating the piston 7 (by means of the stem 6) for dispensing the fluid contained in the bottle.

Figure 4:
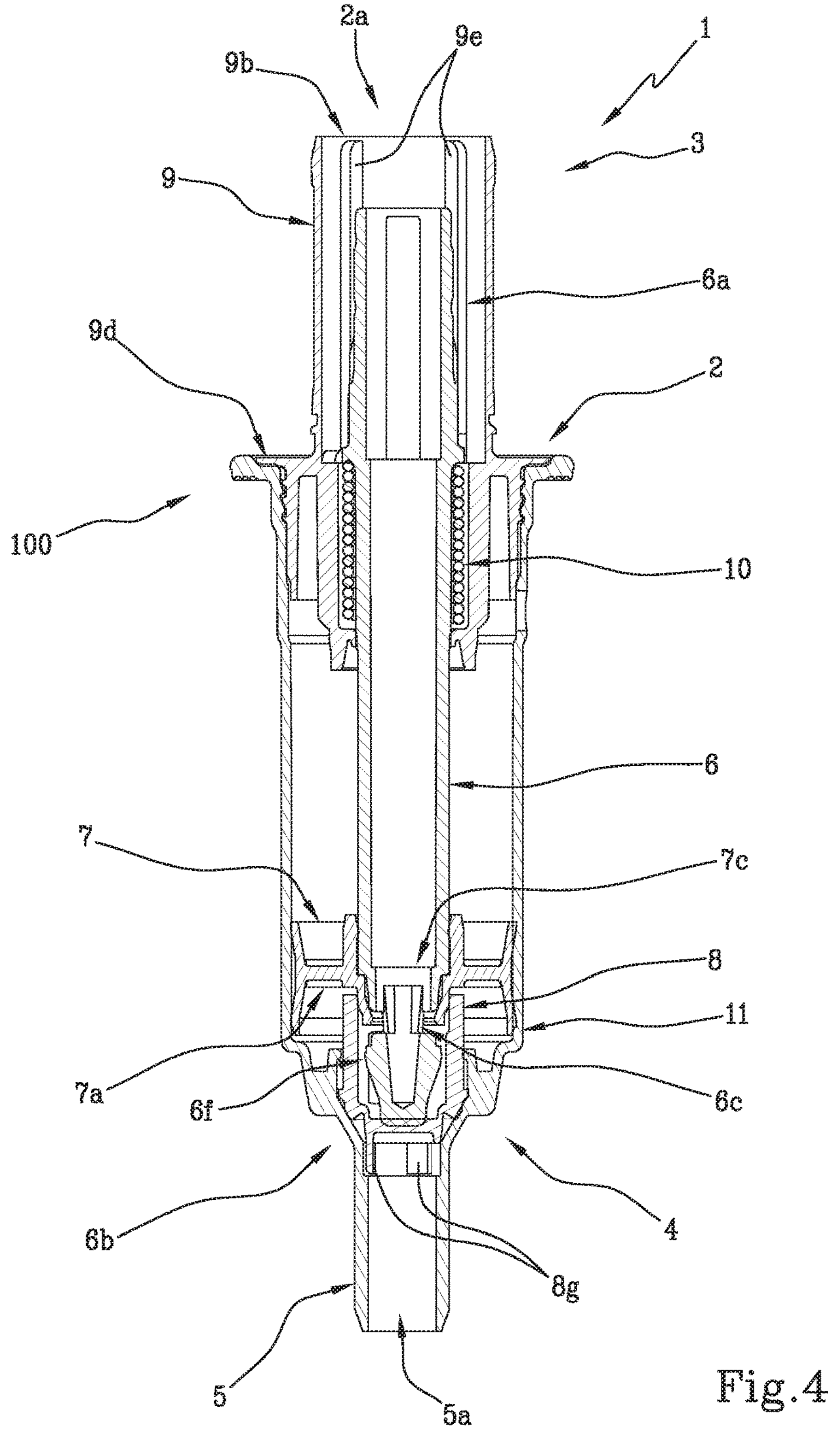
FIG. 4 is a further cross section view of the dispenser shown in FIG. 1.
Figure 5:
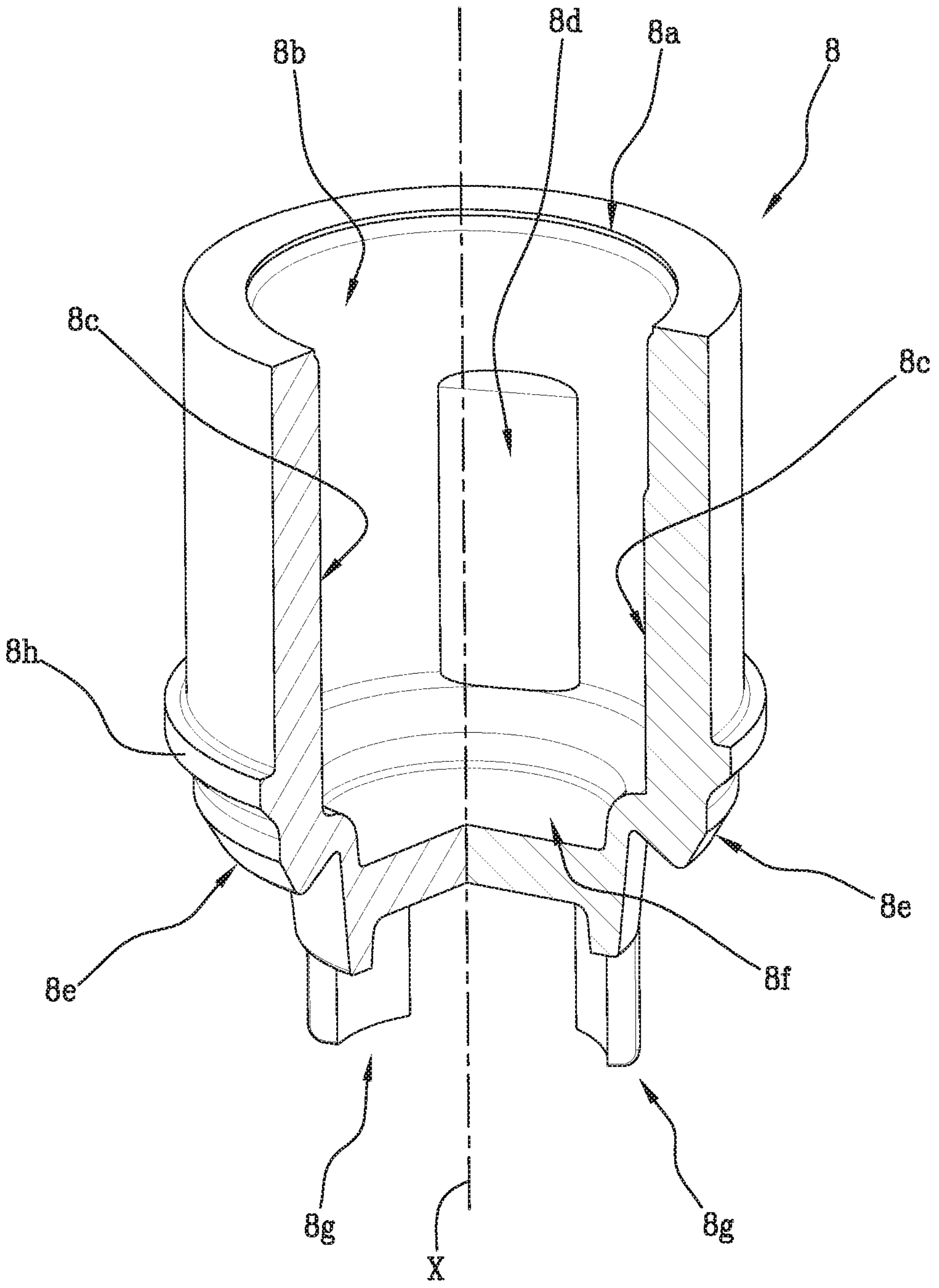
FIG. 5 is a perspective view, with some parts in cross section, of a single element of the dispenser of FIG. 1.

The piston 7 is placed in motion in such a way as to alternate its position inside the containment body 2 between a lowered position (shown in FIGS. 1, 3, 4) and a raised position (not illustrated).

More in detail, the raised position of the piston 7 means the position closest to the top portion 3 of the containment body 2, whilst the lowered position means the position closest to the bottom portion 4 of the containment body 2.

Preferably, the portion with reduced cross-section 6*h* of the stem 6 forms two opposite shoulders 6*e*, 6*f* (or protrusions), which are facing each other, of the stem 6 between which the portion with reduced cross-section is included. The shoulders 6*e*, 6*f* are designed to operate in conjunction with the piston 7 to define limit stop elements of the piston 7 in the sliding between the piston 7 and the stem 6, in both directions.

Preferably, as described above, the type of connection acting between the piston 7 and the stem 6 also allows a fluid-tight seal to be made between the piston 7 and the stem 6, in particular at the upper part of the piston 7.

The piston has at the bottom a lower sealing portion **7*b* which extends axially along the longitudinal axis of the stem 6 and which surrounds, preferably in contact, a portion of the stem 6**.

More preferably, the lower sealing portion **7*b* is positioned outside the above-mentioned portion with a reduced cross-section 6*h* of the stem 6 and abuts against the shoulders 6*e*, 6*f*. This is achieved on one side by a lower end tab which strikes against one of the two shoulders 6*f*, and on the other side, by a radial protrusion which is designed to make contact with the other shoulder 6*e*. In other words, the lower sealing portion 7*b* preferably has an axial hole 7*c* in which the portion with a reduced cross-section 6*h* of the stem 6 is housed, having a diameter less than the axial hole of the remaining part of the piston 7 which houses the cylindrical portion of the stem 6**.

Still more preferably, the lower sealing portion **7*b* of the piston 7 has a cylindrical stretch and an end stretch with a tapered shape, at least in a relative outer surface opposite the stem 6**, preferably frustoconical in shape.

Preferably, the lower sealing portion **7*b* is such as to occlude the lateral opening 6*c* of the stem 6, in a use configuration of the dispenser 1. More specifically, in the configuration in which a lower end tab of the lower sealing portion 7*b* abuts against the shoulder 6*f* of the stem 6, the lateral opening 6*c* is completely occluded thus isolating the covering sleeve 2*a* from the dosing chamber 11**.

Preferably, the lower sealing portion **7*b* is made from the same material as the piston 7 and even more preferably in one piece with the piston 7**.

Inside the containment body 2, at the base of the bottom portion 4, there is a sealing valve 8.

Preferably, the sealing valve 8 is interposed between the suction tube 5 and the dosing chamber 11 for forming a fluid communication between the suction tube 5 and the dosing chamber 11.

The sealing valve 8 is slidably movable parallel to the stem 6 for a predetermined stroke and defines at least one first configuration of exclusive fluid communication between the dosing chamber 11 and the suction tube 5 and a second exclusive fluid communication between the dosing chamber 11 and the covering sleeve **2*a***.

The sealing valve 8 is cup-shaped, defined by a lateral wall **8*c* with an axisymmetric shape (about an axis "X", which coincides with the longitudinal axis of the containment body 2 and the stem 6) closed at the bottom by a base wall 8*f* to form an inner cavity 8*b* which is open at the top. The lateral wall 8*c* extends between a top edge 8*a*, which is circular in shape, and the above-mentioned base wall 8*f*. At a relative lower end, opposite the cavity 8*b*, the sealing valve 8 has guide tabs 8*g* such as to stabilise and correctly maintain the position of the sealing valve 8 during an axial sliding along the containment body 2**.

The sealing valve 8 is movable along the above-mentioned axis "X" so as form a relative sliding with respect to the hollow stem 6 and the piston 7. The relative slides between the sealing valve 8 and the stem 6 with the piston 7 are separate from each other and different.

In other words, the sealing valve 8 is a separate body from the stem 6 and interacts with the stem 6 by a relative predetermined sliding movement inside the containment body 2.

Preferably, the sealing valve 8 has an axial sliding movement relative to the containment body 2 of between 2.5 mm and 3.5 mm, still more preferably equal to approximately 3 mm overall.

The sliding movement of the sealing valve 8 is determined by the axial stroke of a external annular protrusion **8*h* which is held, in a position of maximum lifting of the sealing valve 8, by a stopping tooth 2*b*, preferably annular in shape, which is integral with the bottom portion 4 of the containment body 2. On the other hand, the position of maximum lowering of the sealing valve 8 is determined by the resting of the latter against a respective receiving surface made on the bottom portion of the containment body 2**.

In more detail, the sealing valve 8 has an annular surface **8*e* positioned below and interacting with the above-mentioned receiving surface in such a way as to form a hermetic fluid seal isolating the suction tube 5 from the dosing chamber 11**.

Moreover, preferably, the above-mentioned receiving surface has a frustoconical shape. In the same way, the above-mentioned annular surface **8*e*** also has an external frustoconical shape.

Moreover, preferably, the sealing valve 8 is made in one piece from an elastic material or from a material which offers a high flexibility when mechanical stressed. Preferably, the inner lateral wall **8*c* of the sealing valve 8 has a plurality of projecting inserts 8*d* positioned inside the cavity 8*b* and angularly equidistant about the axis "X", the inserts being necessary to prevent the contact with the upper sealing edge 8*a***.

Advantageously, the upper edge **8*a* of the sealing valve 8 is configured for making a coupling with interference with the lower sealing portion 7*b* of the piston 7. Advantageously, the tapered shape of the end stretch of the lower sealing portion 7*b* facilitates a mutual insertion with the upper edge 8*a* of the sealing valve 8**.

Preferably, the upper edge **8*a* of the sealing valve 8 has a cylindrical inner surface portion 8*c* and the cylindrical stretch of the lower sealing portion 7*b* has a diameter just greater than the diameter of the cylindrical inner surface 8*c* for coupling with interference with the cylindrical inner surface portion 8*c***.

In other words, the cylindrical stretch of the lower sealing portion **7*b* of the piston 7 has a circular shape having an external diameter which is preferably greater than the diameter of the cylindrical inner surface 8*c* of the upper edge 8*a***.

Alternatively, the lower sealing portion **7*b*** could have an entirely frustoconical or tapered shape, without the above-mentioned cylindrical stretch.

Moreover, also the sealing valve 8 (or only the sealing valve 8) can have a tapered inner shape to facilitate a mutual insertion between lower sealing portion **7*b* and sealing valve 8**.

This feature makes the mutual insertion between the lower sealing portion **7*b* and the sealing valve 8 at the upper edge 8*a*** more efficient and secure.

The dispenser 1 also comprises a retaining ring 9 associated with the containment body 2 preferably in the top portion 3 of the containment body 2 and has a hole **9*a* for passage of the stem 6**.

The retaining ring 9 is cylindrical in shape and extends between an upper end **9*b* and a lower end 9*c***.

The retaining ring 9 has a flanged portion **9*d* between the ends 9*b*, 9*c***.

On the inner wall of the hole **9*a* of the ring 9 there are at least two guides 9*e* for accompanying the stroke of the stem 6, in particular of the sliding tabs 6*d* of the stem 6**.

At the base of the guides **9*e* there are also at least two undercuts 9*f*, preferably positioned diametrically opposite each other and at the locking tabs 6*g* present on the stem 6**.

The undercuts 9*f* engage by interference the respective locking tabs 6*g* of the stem 6. In other words, the locking of the stem 6, when it is in the lowered position, occurs by means of a so-called "bayonet" closing system which can be activated by rotating the stem 6 about its own axis.

The dispenser 1 also comprises elastic means 10 for opposing the free sliding movement of the stem 6 (and hence of the piston 7) inside the containment body 2.

In other words, the sliding action of the piston 7 from the lowered position to the raised position is made possible by the action of the elastic means 10.

The elastic means 10 preferably comprise a helical spring.

The operation of the above-mentioned dispenser is now described, illustrating the path that the fluid in the bottle takes to come out of the dispenser 1 and be available to a user.

With reference to all of the accompanying drawings, it should be noted that the dispenser 1 is always illustrated in the closed configuration with the spout completely lowered, that is, when the stem 6 and thus also the piston 7 are in the lowered position.

In the dispenser 1 the path of the fluid from the bottle to a dispensing spout starts from a condition of raising of the stem 6 (and therefore of the piston 7 and the sealing valve 8) and then by a lowering of the stem 6 (and in a predetermined sequence also of the piston 7 and of the valve 8) to the stroke end.

During the raising step of the stem 6, the fluid is sucked from the bottom of the bottle to the dosing chamber 11; during the lowering step of the stem 6 the fluid is pumped from the dosing chamber 11 along the inner cavity of the stem 6 towards the outside through a dispensing spout.

More specifically, during the raising step, the stem 6 slides axially upwards and the elastic means 10 adopt a configuration of maximum extension.

In the first stretch of the raising performed by the stem 6, the shaped head designed to interact with the closed base wall 8*f* of the sealing valve 8 is disengaged freeing the sealing valve 8 from compression.

At the same time, the hermetic seal between the sealing valve 8 and the containment body 2 close to the lower suction tube 5 is deactivated. In other words, there is no longer isolation of fluid between the bottle and the dosing chamber 11.

The piston 7, during the raising of the stem 6 which runs through the axial hole 7*c*, is stationary as it is held by the friction with the walls of the containment body 2 until the abutment shoulder 6*f* of the stem 6 comes into contact with a lower end tab of the lower sealing portion 7*b*.

At the moment of impact between the shoulder 6*f* and the tab of the sealing portion 7*b* three conditions occur, in particular the piston 7 starts to slide axially upwards along the cavity of the containment body 2 drawn by the stem 6.

Another important condition which occurs with the impact described above is that the lateral opening 6*c* of the stem 6 is completely occluded by the lower sealing portion 7*b*.

In this way, the residual fluid present in the inner cavity of the stem 6 is prevented from being drawn into the dosing chamber 11 during the raising stroke of the stem 6. The upwards sliding of the piston 7 creates a negative pressure inside the dosing chamber 11.

Another important condition during this operating step of the dispenser 1 is determined by the negative pressure inside the dosing chamber 11 which draws upwards also the sealing valve 8. For this reason, the sealing valve 8 slides upwards until the external annular protrusion 8*h* comes into contact with the stopping tooth 2*b* of the containment body 2.

In this way there is full fluid communication between the lower suction tube 5 and the dosing chamber 11. For this reason, the raising of the piston 7 causes a negative pressure in the dosing chamber 11 such as to suck fluid in the dosing chamber 11, corresponding to a predetermined quantity.

The stem 6 and the piston 7 associated with it continue the raising stroke until an upper portion of the piston 7 comes into contact with a raised tab or contact of the lower portion 9*c* of the retaining ring 9.

The impact between the lower portion 9*c* of the retaining ring and an upper portion of the piston 7 determines the upstroke limit stop of the stem 6 and of the piston 7.

This defines the maximum volume of the dosing chamber 11 between the lower surface 7*a* of the piston 7 together with the inner walls of the containment body 2 to the bottom portion 4.

The raising stoke performed by the piston 7 is different from the raising upstroke performed by the sealing valve 8; preferably the stroke which the piston 7 performs is much greater than the stroke performed by sealing valve 8.

In short, the dispenser 1 completely raised is such as to have the maximum quantity of fluid loaded in the dosing chamber 11, the elastic means 10 have adopted the maximum possible extension, the hermetic seal active between the sealing valve 8 and the bottom wall of the containment body 2 has been deactivated, the sealing valve 8 has completed the stroke to a maximum raised position and the lateral opening 6*c* of the stem 6 has been closed.

Starting from the configuration described above, a subsequent pressure by a user on the dispensing spout of the dispenser 1 starts the movement towards the lowered configuration of the dispenser 1.

In the first step of sliding downwards of the spout and hence of the stem 6, the piston 7 remains stationary as it is held by friction against the walls of the containment body 2 until the annular shoulder 6*e* of the stem 6 comes into contact with a radial protrusion of the lower sealing portion 7*b* of the piston 7.

At the moment of impact between the shoulder 6*e* and the radial protrusion of the lower sealing portion 7*b* of the piston 7 the piston 7 starts to slide downwards, in the opposite direction to the raising sliding described above.

Another important condition which occurs with the impact described above is that the lateral opening 6*c* of the stem 6 is completely free (open); in other words, there is full fluid communication between the dosing chamber 11 and the inner cavity of the stem 6.

The downwards sliding of the piston 7 create an increase in the pressure inside the dosing chamber 11 such as to push the fluid contained in it towards the outside passing through the lateral opening 6*c* and the inner cavity of the stem 6 up to a dispensing spout and, therefore, the outside.

The pressure inside the dosing chamber 11 is also such as to also push downwards the sealing valve 8.

For this reason, the sealing valve 8 slides downwards until the outer annular surface 8*e* rests against the respective receiving surface made on the bottom portion of the containment body 2.

In this way the fluid communication between the lower suction tube 5 and the dosing chamber 11 is prevented. In other words, the dosing chamber 11 is isolated from the bottle.

The completion of the downwards sliding stroke towards the bottom of the stem 6 is defined by the impact of its lower portion 6*b* in the form of a shaped head against the bottom wall 8*f* of the sealing valve 8.

The elastic means 10 in this case adopt a configuration of maximum compression.

The pressure of the stem 6 on the valve 8 causes an elastic deformation of the sealing valve which creates the hermetic seal between the sealing valve 8 and the bottom wall of the containment body 2.

During the impact of the stem 6 with the sealing valve 8, the tapered shape of the end stretch of the lower sealing portion 7*b* is inserted into the upper edge 8*a* of the sealing valve 8 deforming it elastically.

Advantageously, the insertion of the lower sealing portion 7*b* into the upper edge 8*a* creates a new a hermetic seal such as to isolate the lower suction tube 5 from the dosing chamber 11.

In other words, in the completely lowered configuration of the stem 6, the sealing valve 8 is configured in such a way as to create two zones with a hermetic seal: a first hermetic seal is formed between the sealing valve 8 and the piston 7 and a second a hermetic seal is formed between the sealing valve 8 and the bottom wall of the containment body 2.

The forces present which activate the first hermetic seal and the second hermetic seal are different and independent: in the case of the first hermetic seal the pressure of the stem 6 on the valve 8 causes an elastic deformation of the sealing valve which allows the described seal to be formed.

In the case of the second hermetic seal the interference of the diameters of the lower sealing portion 7*b* and of the upper edge 8*a* form a coupling by interference between the surfaces in contact of the piston 7 and the sealing valve 8 forming the above-mentioned seal.

Advantageously, both the hermetic seals can be activated simultaneously in a closed configuration of the dispenser 1, that is to say, with the stem 6 in the lowered position and with the locking tabs 6*g* engaged by interference in the respective undercuts 9*f* of the retaining ring 9.

Moreover, with reference to the first hermetic seal between the valve 8 and the bottom wall of the containment body 2, the pressure of the sealing valve 8 on a sloping surface creates a greater contact surface (with advantages in terms of the hermetic seal) between the annular surface 8*e* and the containment body 2, with equal dimensions in a radial direction relative to the axis "X" of the sealing valve 8 and of the containment body 2 at the bottom portion 4. In other words, the dispenser 1 is compact and equipped with effective hermetic sealing.

Further and different configurations of this invention, included in the inventive concept of the invention, are briefly described below.

More specifically, the lower sealing portion 7*b* of the piston 7 may be made of a material different from that of the piston 7, preferably elastically deformable.

For example, the lower sealing portion 7*b* is made of a plastic material for sealing liquid substances.

In another embodiment of the dispenser 1, there is a sealing gasket between the sealing valve 8 and the piston 7 to achieve the predetermined fluid retainment. In other words, the lower sealing portion 7*b* of the piston 7 comprises a gasket designed for achieving the hermetic seal with a top edge of the sealing valve 8.

In a different embodiment of the sealing valve 8, at the outer annular surface 8*e* there is a layer of elastically deformable material, preferably a plastic material for sealing liquid substances.

Preferably, the elements of the dispenser 1 such as the stem 7, the piston 7, the sealing valve 8 and the retaining ring 9 are made of plastic material compatible with liquid detergents.

The dispenser 1 according to this invention achieves the preset aim, keeping the fluid inside the bottle isolated from the outside environment.

Advantageously, the dispenser 1 according to this invention is able to adopt a closed and locked configuration such that it is compatible with the "shelf condition", without being subject to the accidental and/or involuntary escape of fluids.

The stem 6 in the lowered configuration also allows a reasonable saving of space for storage and during the transport and/or packaging of the dispenser 1.

The structure of the dispenser 1 in the closed configuration also allows a stable position to be granted to the stem but especially to the piston 7 and the sealing valve 8 such that it is free of any type of entity and variation of load acting on the dispensing spout at the head of the stem 6.

In other words, the stacking of several packages of the dispenser 1 and/or the high stresses due to transport do not adversely affect the hermetic seal of the dispenser 1 which is therefore free of any loss of fluid.

The dispenser 1 with a hermetic seal according to this invention comprises few elements so as to allow a faster and easier assembly.

Moreover, the dispenser 1 has an optimised structure such that the dispenser 1 is light and practical to use, and has compact dimensions as described above.

The invention claimed is:

1. A dispenser with a hermetic seal comprising a hollow containment body which can be inserted in and secured to a bottle, the dispenser also comprising, housed inside the containment body:

a lower suction tube having an orifice for sucking a fluid from the bottle, a covering sleeve, a piston slidable inside the containment body between a raised position and a lowered position, a hollow stem axially slidable inside the containment body and having a lower portion on which the piston is mounted and an upper portion associated with the covering sleeve, the stem and the piston defining, in conjunction with a bottom portion of the containment body, a dosing chamber with variable volume, and a sealing valve inserted inside the bottom portion of the containment body and interposed between the suction tube and the dosing chamber for adjusting a fluid communication between the suction tube and the dosing chamber, wherein the sealing valve is cup-shaped and the piston has a lower sealing portion to interact with an upper edge of the sealing valve making a hermetic seal between the sealing valve and the lower sealing portion of the piston, and wherein the hermetic seal between the piston and the sealing valve is achieved by a coupling with interference between the upper edge of the sealing valve and the lower sealing portion of the piston, wherein the upper edge of the sealing valve has a cylindrical inner surface portion and wherein the lower sealing portion has a cylindrical outer surface portion having a diameter greater than the diameter of the cylindrical inner surface for coupling with interference with the cylindrical inner surface portion, and wherein the cylindrical inner surface portion of the sealing valve is disposed radially outer with respect to the cylindrical outer surface of the lower sealing portion.

2. The dispenser according to claim 1, wherein the lower sealing portion of the piston is made in one piece with the piston and is made of the same material as the piston.

3. The dispenser according to claim 1, wherein the lower sealing portion of the piston is elastically deformable.

4. The dispenser according to claim 1, wherein the sealing valve has an inner lateral wall that is circular about an axis of extension, the inner lateral wall having a plurality of projecting inserts (8*d*) arranged symmetrically around the axis of extension.

5. The dispenser according to claim 1, wherein at least one of the lower sealing portion and the sealing valve has a tapered shape to facilitate a mutual insertion between the lower sealing portion and the sealing valve.

6. The dispenser according to claim 1, wherein the lower sealing portion of the piston extends about a portion of the stem and is in contact with the stem.

7. The dispenser according to claim 1, wherein the stem has an annular shoulder against which an end edge of the lower sealing portion is able engage, simply by resting, for defining at least one limit stop condition of a mutual sliding between the piston and the stem.

8. The dispenser according to claim 1, wherein the stem has at least one lateral opening for putting in fluid communication the covering sleeve with the dosing chamber, and wherein the at least one lateral opening is closed by the lower sealing portion in at least one operating configuration.

9. The dispenser according to claim 1, wherein the sealing valve has a cylindrical lateral wall and a closed base wall for defining an inner cavity and also has, on a lower portion, an annular surface designed to interact in compression with the lower portion of the containment body forming a hermetic seal between the sealing valve and the containment body, and wherein the hollow stem has at the bottom a head designed to interact with the closed base wall of the sealing valve and to deform elastically the sealing valve in compression forming a hermetic seal between the sealing valve and the containment body close to the orifice in a lowered position of the hollow stem.

10. The dispenser according to claim 1, wherein the containment body has a receiving surface frustoconical in shape on which the annular surface of the sealing valve rests and is compressed.

11. The dispenser according to claim 1, wherein the sealing valve is slidably movable parallel to the stem for a predetermined stroke and defines at least one first configuration of exclusive fluid communication between the dosing chamber and the suction tube and a second exclusive fluid communication between the dosing chamber and the covering sleeve.

12. The dispenser according to claim 1, wherein the lower sealing portion has a tapered shape to facilitate a mutual insertion between the lower sealing portion and the sealing valve.

* * * * *